(12) United States Patent
Kim et al.

(10) Patent No.: US 6,477,157 B1
(45) Date of Patent: Nov. 5, 2002

(54) DEDICATED CONTROL CHANNEL HANDOFF IN CDMA COMMUNICATION SYSTEM

(75) Inventors: Dae-Gyun Kim, Seoul (KR); Chang-Hoi Koo, Kyunggi-do (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/441,483

(22) Filed: Nov. 17, 1999

(30) Foreign Application Priority Data

Nov. 17, 1998 (KR) ........................................ 1998-19862

(51) Int. Cl.[7] ................................................ H04Q 7/00
(52) U.S. Cl. ........................ 370/331; 370/208; 370/209; 370/335; 370/341; 455/436
(58) Field of Search ................................ 370/208, 209, 370/331, 335, 341, 342, 441; 455/436, 438, 442; 375/130, 140

(56) References Cited

U.S. PATENT DOCUMENTS 6,067,290 A * 5/2000 Paulraj et al. ............... 370/329
6,314,125 B1 * 11/2001 Shanbhag .................... 370/208

* cited by examiner

*Primary Examiner*—Doris H. To
(74) *Attorney, Agent, or Firm*—Dilworth & Barrese, LLP (57) ABSTRACT

A handoff method in a CDMA communication system using Walsh codes and quasi-orthogonal codes. To implement a handoff, a new base station to which a call is switched notifies a serving base station of an available quasi-orthogonal code, if the new base station has no available Walsh codes. The serving base station transmits a handoff direction message to a mobile station and the mobile station communicate with the new base station using the quasi-orthogonal code included in the handoff direction message.

12 Claims, 7 Drawing Sheets

| FIELD | LENGTH (BITS) |
|---|---|
| MSG_TYPE('00011111') | 8 |
| ACK_SEQ | 3 |
| MSG_SEQ | 3 |
| ACK_REQ | 1 |
| ENCRYPTION | 2 |
| USE_TIME | 1 |
| ACTION_TIME | 6 |
| HDM_SEQ | 2 |
| P_REV | 8 |
| SEARCH_INCLUDED | 1 |
| SRCH_WIN_A | 0 OR 4 |
| SRCH_WIN_N | 0 OR 4 |
| SRCH_WIN_R | 0 OR 4 |
| T_ADD | 0 OR 6 |
| T_DROP | 0 OR 6 |
| T_COMP | 0 OR 4 |
| T_TDROP | 0 OR 4 |
| SOFT_SLOPE | 0 OR 6 |
| ADD_INTERCEPT | 0 OR 6 |
| DROP_INTERCEPT | 0 OR 6 |
| HARD_INCLUDED | 1 |
| FRAME_OFFSET | 0 OR 4 |
| PRIVATE_LCM | 0 OR 1 |
| RESET_L2 | 0 OR 1 |
| RESET_FPC | 0 OR 1 |
| SERV_NEG_TYPE | 0 OR 1 |

| FIELD | LENGTH (BITS) |
|---|---|
| ENCRYPT_MODE | 0 OR 2 |
| NOM_PWR_EXT | 0 OR 1 |
| NOM_PWR | 0 OR 4 |
| NUM_PREAMBLE | 0 OR 3 |
| BAND_CLASS | 0 OR 5 |
| CDMA_FREQ | 0 OR 11 |
| RETURN_IF_HANDOFF_FAIL | 1 |
| COMPLETE_SEARCH | 1 |
| PERIDIC_SAERCH | 1 |
| FCH_NCLUDED | 1 |
| DCCH_INCLUDED | 1 |
| USE_PWR_CNTL_STEP | 1 |
| PWR_CNTL_STEP | 0 OR 3 |
| NUM_PILOTS | 3 |

NUM_PILOTS OCCURRENCES OF THE FOLLWING RECORD:

| | |
|---|---|
| PILOT_PN | 9 |
| PWR_COME_IDN | 1 |
| CODE_CHAN_FCH | 0 OR 10 |
| CODE_CHAN_DCCH | 0 OR 10 |
| QOF_MASK_ID | 0 OR 2 |

| | |
|---|---|
| RESERVED | 0-7 (AS NEEDED) |

FIG. 5B

| CHAN_INDICATOR | 2 |
|---|---|
| DCCH_LENGTH | 5 |
| FREQ_INCL_DCCH | 1 |
| DEFAULT_CONFIG_DCCH | 3 |
| BYPASS_ALERT_ANSWER_DCCH | 1 |
| NUM_PILOTS_DCCH | 3 |
| GRANTED_MODE_DCCH | 2 |
| FRAME_OFFSET_DCCH | 4 |
| ENCRYPT_MODE_DCCH | 2 |
| BAND_CLASS_DCCH | 0 OR 5 |
| CDMA_FREQ_DCCH | 0 OR 11 |

| QOF_MASK_ID_DCCH | 2 |
|---|---|
| PILOT_PN_DCCH | 9 |
| PWR_COMB_IND_DCCH | 1 |
| CODE_CHAN_DCCH | 10 |

| RESERVED_DCCH | 0-7 (AS NEEDED) |
|---|---|

FIG. 5C

| FCH_LENGTH | 5 |
|---|---|
| FREQ_INCL_FCH | 1 |
| DEFAULT_CONFIG_FCH | 3 |
| BYPASS_ALERT_ANSWER_FCH | 1 |
| RESERVED_FCH | 1 |
| NUM_PILOTS_FCH | 3 |
| GRANTED_MODE_FCH | 2 |
| FRAME_OFFSET_FCH | 4 |
| ENCRYPT_MODE_FCH | 2 |
| BAND_CLASS_FCH | 0 OR 5 |
| CDMA_FREQ_FCH | 0 OR 11 |

| QOF_MASK_ID_FCH | 2 |
|---|---|
| PILOT_PN_FCH | 9 |
| PWR_COMB_IND_FCH | 1 |
| CODE_CHAN_FCH | 10 |

| RESERVED_FCH | 0-7 (AS NEEDED) |
|---|---|

DEDICATED CONTROL CHANNEL HANDOFF IN CDMA COMMUNICATION SYSTEM

BACKGROUND OF THE INVENTION

1. Field of the Invention

The present invention relates generally to a communication method in a CDMA (Code Division Multiple Access) communication system, and in particular, to a method of implementing a dedicated control channel (DCCH) handoff.

2. Description of the Related Art

One method of increasing system capacity in a CDMA communication system, is through channelization, wherein orthogonal codes are used. The orthogonal codes can be Walsh codes. The orthogonal channelization is applied to a forward link in the IS-95 standard, for example.

To provide orthogonal channelization to the forward link in an IS-95 communication system, common channels (a pilot channel, a paging channel, and a sync channel) are spread using predetermined orthogonal codes and a traffic channel assigned for a user is spread using an idle orthogonal code. Then, a serving base station (BS) notifies a mobile station (MS) of the index of the assigned orthogonal code and the MS despreads a received signal using the same orthogonal code.

Each channel on the IS-95 forward link is convolutionally encoded and a modulator performs BPSK (Bi-Phase Shift Keying) modulation. The bandwidth used is 1.2288 MHz and the data rate is 9.6 kbps in the IS-95 communication system. Therefore, 64 channels (=1.2288M/(9.6 k×2)) on an IS-95/IS-95A forward link are distinguished by 64 orthogonal codes. The number of available orthogonal codes is obtained after a modulation scheme and a minimum data rate are determined.

In the IS-95 system, a BS uses a soft handoff when directing a MS from one forward traffic channel to another forward traffic channel having the same frequency assignment. The soft handoff occurs when an MS moves out of the coverage area of a serving BS in an old cell and enters a neighboring BS in a new cell. During soft handoff, the system establishes a link between the MS and the new BS without disconnecting the MS from the serving BS and switches the call to the new BS.

The IS-95 system has a traffic channel as the only dedicated channel. However, the next-generation of CDMA communication systems will increase channel transmission capacity by increasing the number of channels available to users. To do so, the next-generation of CDMA links are comprised of dedicated channels including traffic channels and a dedicated control channel, and common channels including a pilot channel, a common control channel, and a paging channel. The traffic channels include a fundamental channel (FCH) used for voice transmission and a supplemental channel used for transmission of packet data.

Handoff is defined for a fundamental channel only in the conventional CDMA communication system and therefore a handoff cannot be implemented for a dedicated control channel in the next-generation of CDMA communication systems. Therefore, a new handoff procedure must be suggested to the standardization organization, that implements the new channels defined in the next-generation of CDMA communication systems. See Korea Patent No. 98-4498 for a detailed description of the dedicated control channel and Korea Patent No. 98-11381 for a detailed description of forward and reverse channels used in the CDMA 2000 system.

SUMMARY OF THE INVENTION

It is, therefore, an object of the present invention to provide a channel assigning device and method in a CDMA communication system, wherein a dedicated control channel is additionally assigned to switch a call to a new BS during handoff.

It is another object of the present invention to provide a channel assigning device and method in a CDMA communication system, in which a channel is additionally assigned using a quasi-orthogonal code due to lack of available orthogonal codes to switch a call to a new BS during handoff.

It is a further object of the present invention to provide a channel assigning method in a CDMA communication system, wherein an MS analyzes a handoff direction message (HDM) received on a traffic channel and assigns a reception channel corresponding to the transmission channel according to a channel ID specified in the handoff direction message.

It is still another object of the present invention to provide a method of forming a handoff direction message to be transmitted to an MS by a BS during a handoff in a CDMA communication system.

To achieve the above objects, there is provided a handoff method in a CDMA communication system using Walsh codes and quasi-orthogonal codes. To implement a handoff, a new base station to which a call is switched notifies a serving base station of an available quasi-orthogonal code, if the new base station has no available Walsh codes. The serving base station transmits a handoff direction message to a mobile station and the mobile station communicates with the new base station using the quasi-orthogonal code included in the handoff direction message.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail to avoid obscuring the invention in unnecessary detail.

The present invention pertains to a CDMA mobile communication system. In the present invention, quasi-orthogonal codes and orthogonal codes are used. In order to distinguish the quasi-orthogonal codes from the orthogonal codes, the orthogonal codes used in the IS-95 communication system are termed Walsh codes in the following description., Quasi-orthogonal code generating methods are disclosed in detail in Korea Patent No. 97-46406 and No. 98-29576.

A description of a handoff procedure in a CDMA communication system and a dedicated control channel handoff procedure in the next-generation CDMA system according to an embodiment of the present invention is provided hereinbelow with reference to the attached drawings. Here, a transmitting device is a BS forward link transmitter and a receiving device is an MS forward link receiver.

Figure 1:
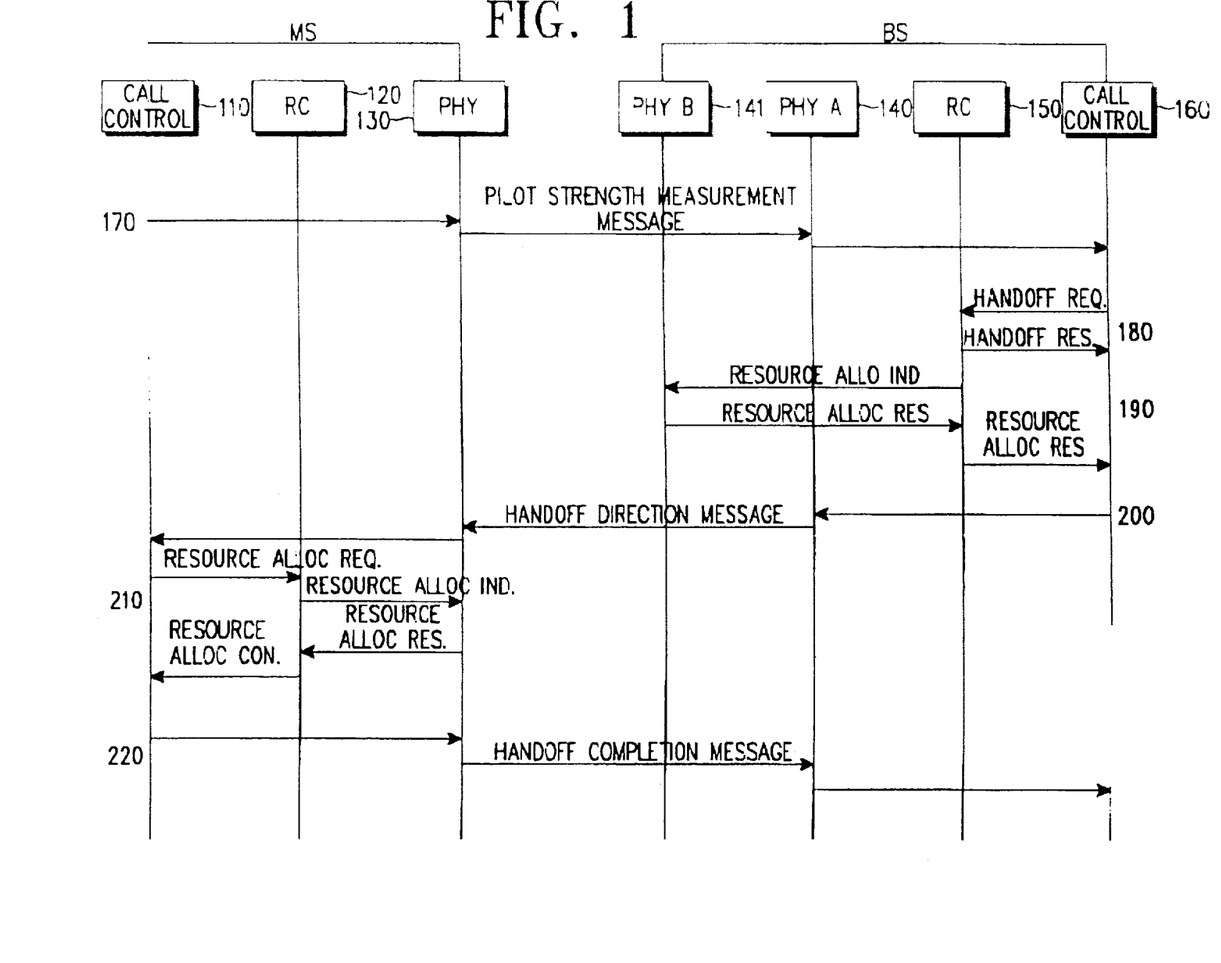
FIG. 1 illustrates a channel assignment procedure for handoff within and between a BS and an MS in a CDMA communication system in accordance with the present invention.

FIG. 1 illustrates a procedure in which a serving BS assigns a dedicated traffic channel to an MS for communication with a new BS to which the serving BS switches a call during handoff. The dedicated traffic channel can be a fundamental channel or a dedicated control channel.

Referring to FIG. 1, the MS is comprised of a call control block 110, a resource controller (RC) 120, and a physical channel block (PHY) 130. The call control block 110 provides the overall control for call set-up and call release to the MS. The RC 120 contains the physical and logical resources associated with a call set-up in the MS, and the PHY 130 subjects actual data for transmission to channel encoding, spreading, and modulation.

A serving BS has a plurality of BS transmitting devices (i.e., PHY A 140 and PHY B 141) and a plurality of BS controlling devices (i.e., an RC 150, and a call control block 160). It can be further contemplated that the serving BS includes the PHY 140, the RC 150, and the call control block 160, and a new BS includes the PHY 141, an RC (not shown), and a call control block (not shown). The serving BS in the present invention is configured as in the latter case.

Prior to handoff, each BS transmits a pilot signal through the PHY 140 or 141.

It is assumed herein that the PHY 140 is a transmitter of the serving BS, for transmitting data to the MS before a handoff occurs and the PHY 141 is a physical device of the new BS to which a call is switched. These devices modulate, spread, and encode data. The RC 150 has the physical and logical resources associated with call set-up in the BS and the call control block 160 controls call set-up, corresponding to the call control block 110 of the MS.

While it is apparent from the description that the BS has a transmitter and the MS has a receiver, the BS and the MS also have a receiver and a transmitter respectively corresponding to the MS transmitter and the BS receiver, to transmit and receive reverse link channel information.

Referring to FIG. 1, for channel assignment during handoff, the MS measures the strengths of pilot signals received from a plurality of BSs continually in step 170. If a pilot strength measurement exceeds a predetermined threshold for a given BS, the MS adds the BS sending the corresponding pilot channel to a candidate set and transmits a pilot strength measurement message (PSMM) to the currently serving BS through the PHY 130. Upon receipt of the PSMM through the PHY 140, the call control block 160 of the serving BS determines whether a handoff is required based on the PSMM. If a handoff is required, the call control block 160 transmits a handoff request message to the RC 150 in step 180. Then, the RC 150 determines whether a traffic channel can be additionally assigned between the MS and the new BS added to the candidate set by checking the availability of Walsh codes and physical channels. In the embodiment of the present invention, the availability of quasi-orthogonal codes is also checked. The RC 150 transmits the determination result to the call control block 160. If the traffic channel can be assigned and an available Walsh code and an available physical channel exist, the call control block 160 transmits a resource allocation order to the PHY 141 in order to assign a physical channel to the new BS, in step 190. If no available Walsh codes exist, it is determined whether an available quasi-orthogonal code exists in the present invention. If an available quasi-orthogonal code exists, the call control block 160 commands the PHY 141 to assign a physical channel to the new BS using the quasi-orthogonal code.

The serving BS and the new BS can be connected through an inter-base station network. In other words, if a single BS controlling device (BSC) covers a plurality of BS devices (BTSs), the BS controlling device has a call control block and an RC. Therefore, a BS with PHY A and a BS with PHY B are connected to the BS controlling device through a wired network. If the serving BS needs to handoff a call to the new BS, the call control block 160 requests a handoff and the RC 150 detects radio resources available to the new BS. Upon receipt of the available radio resources, the call control block 160 assigns the radio resources to the new BS through the wired network and the new BS transmits a resource allocation response message for the channel assignment to the RC 150.

In step 200, the call control block 160 transmits an handoff direction message (HDM) to the MS through the PHY 140, notifying the MS of the handoff enabled situation and information about the physical channel assigned to the new BS. According to the present invention, if the MS communicates with the serving BS on a dedicated control channel, the HDM includes information about the dedicated control channel.

The call control block 110 receives the HDM through the PHY 130. Then, the call control block 110 controls the RC 120 in assigning the Walsh code and the physical channel necessary for channel demodulation by analyzing the channel HDM and in transmitting the information to the PHY 130 in step 210. The PHY 130 assigns a forward link channel receiver with the same resources as those contained in the forward link channel assignment and then the MS sends a handoff completion message (HCM) to the serving BS to notify the BS that it is ready to demodulate a channel signal to be received from the new BS, in step 220.

Figure 2A:
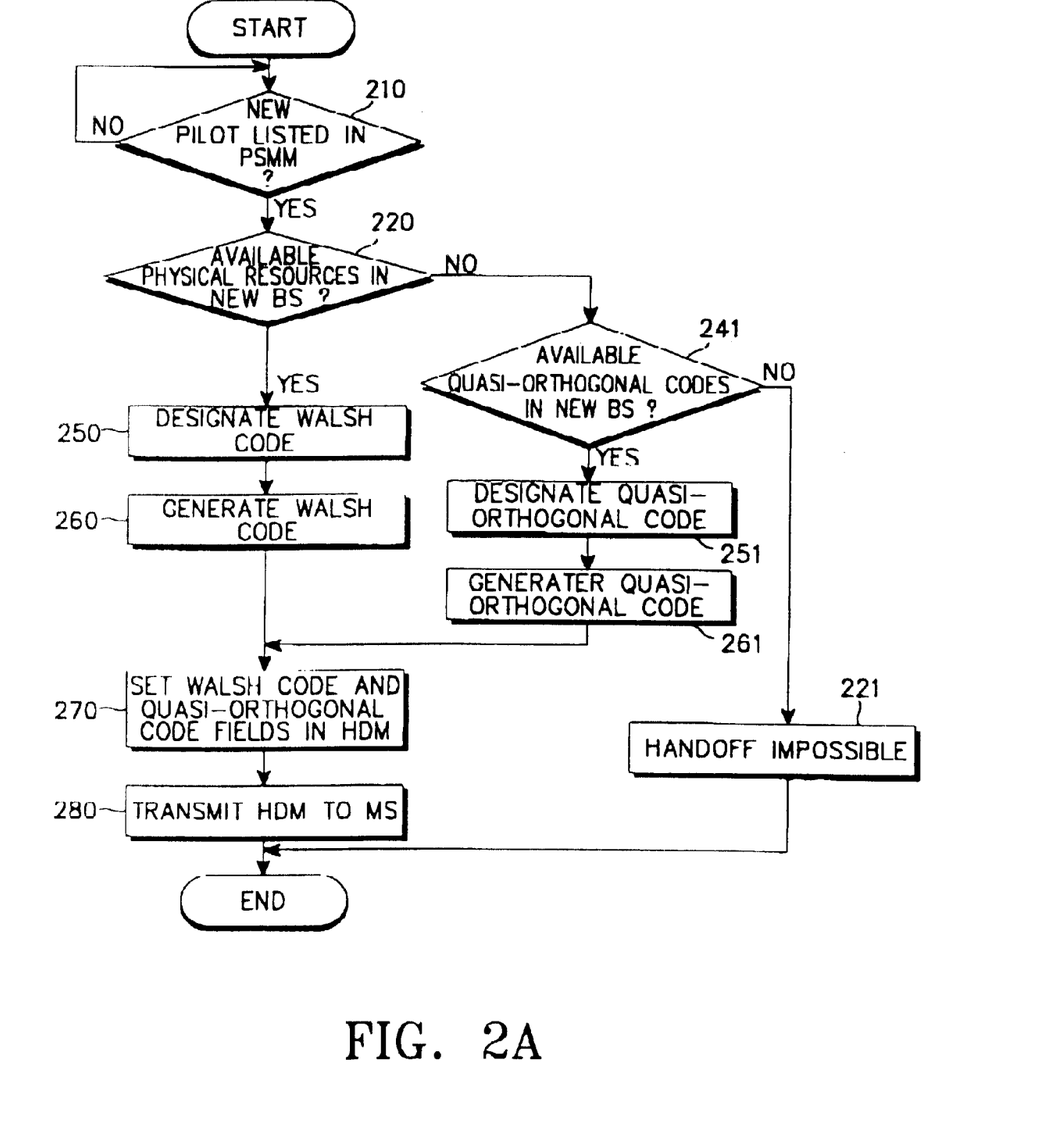
FIG. 2A is a flowchart depicting a handoff procedure in the BS of a CDMA communication system in accordance with the present invention.
Figure 2B:
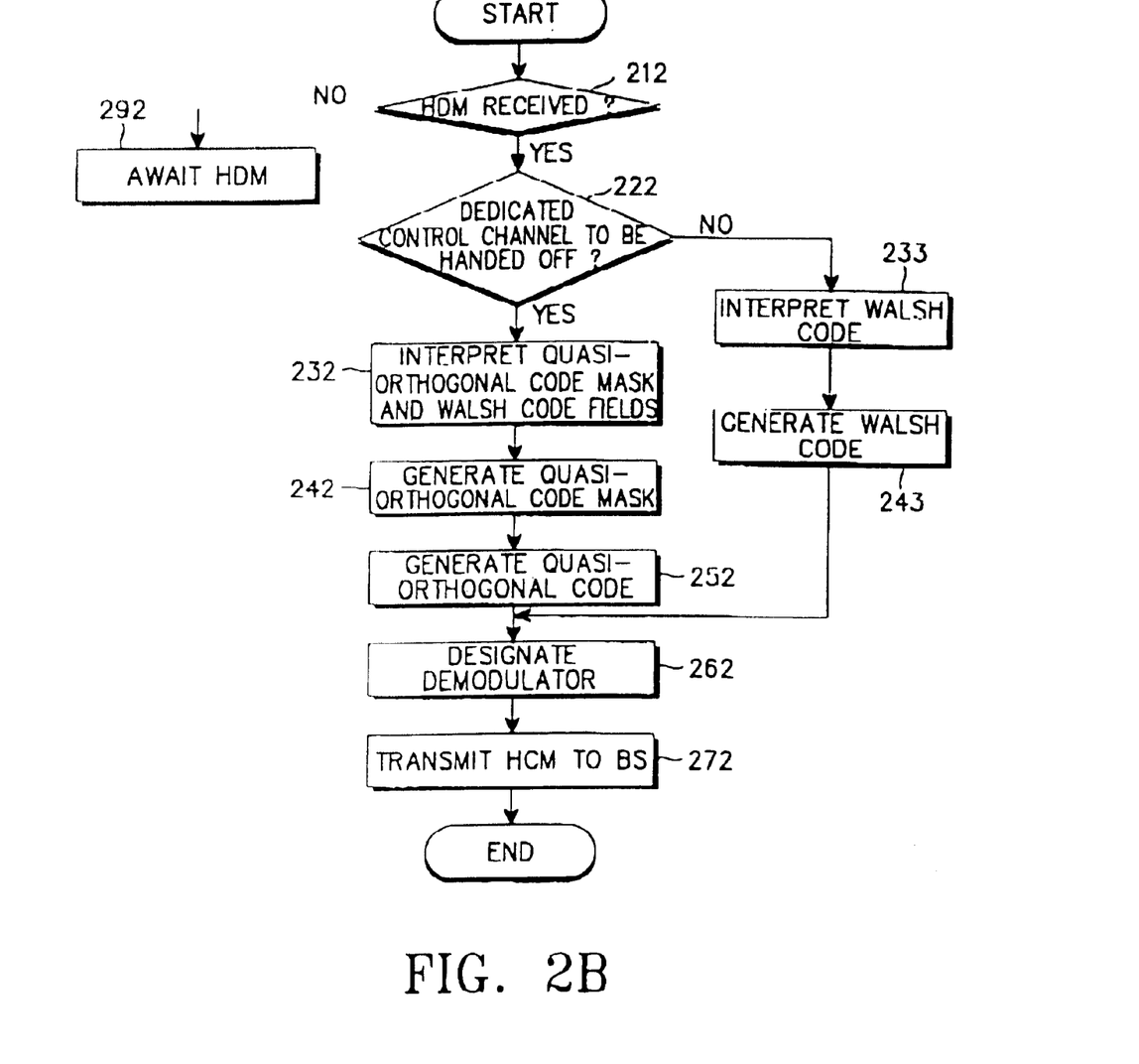
FIG. 2B is a flowchart depicting a handoff procedure in the MS of the CDMA communication system in accordance with the present invention.

Steps 180, 190, and 210 of FIG. 1 are performed in the procedures of FIGS. 2A and 2B.

Before describing the flowcharts shown in FIGS. 2A and 2B, message fields of an HDM shown in FIGS. 5A, 5B, and 5C will be described for better understanding of the embodiment of the present invention.

Figure 5A:
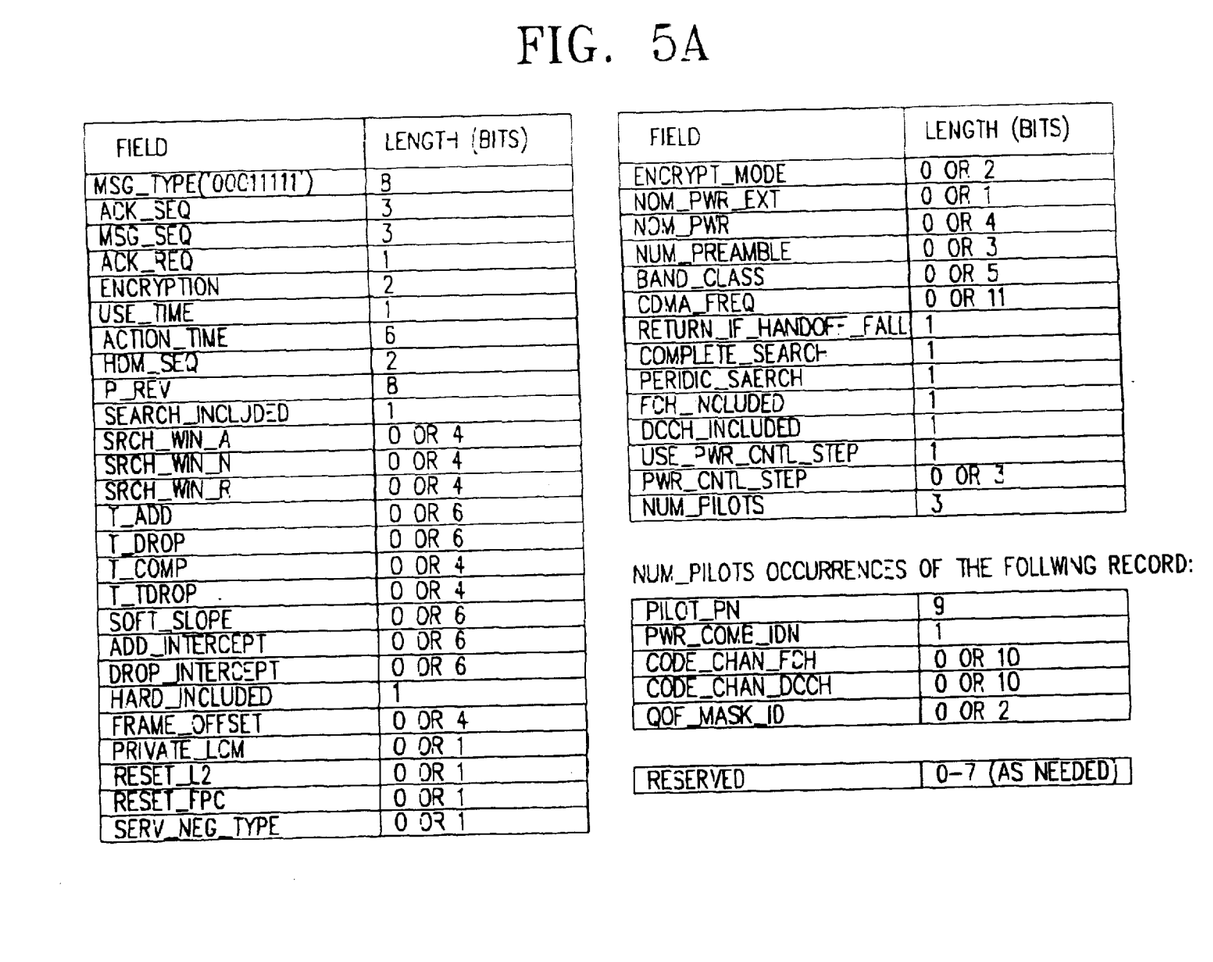
FIGS. 5A, 5B, and 5C illustrate message formats used to concurrently handoff a call to a dedicated control channel and a fundamental channel in the CDMA communication system in accordance with the present invention.
Figure 5B:
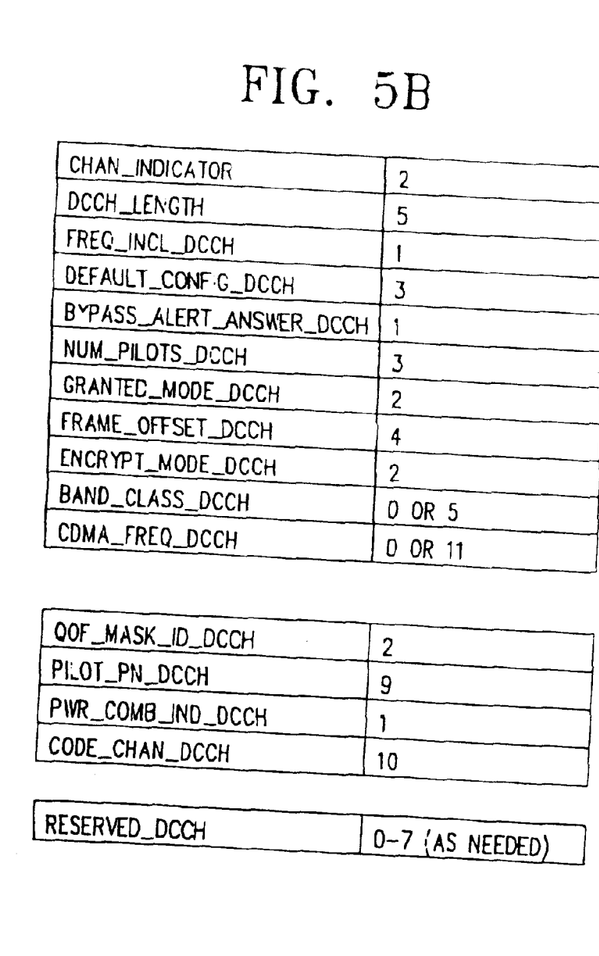
Figure 5C:
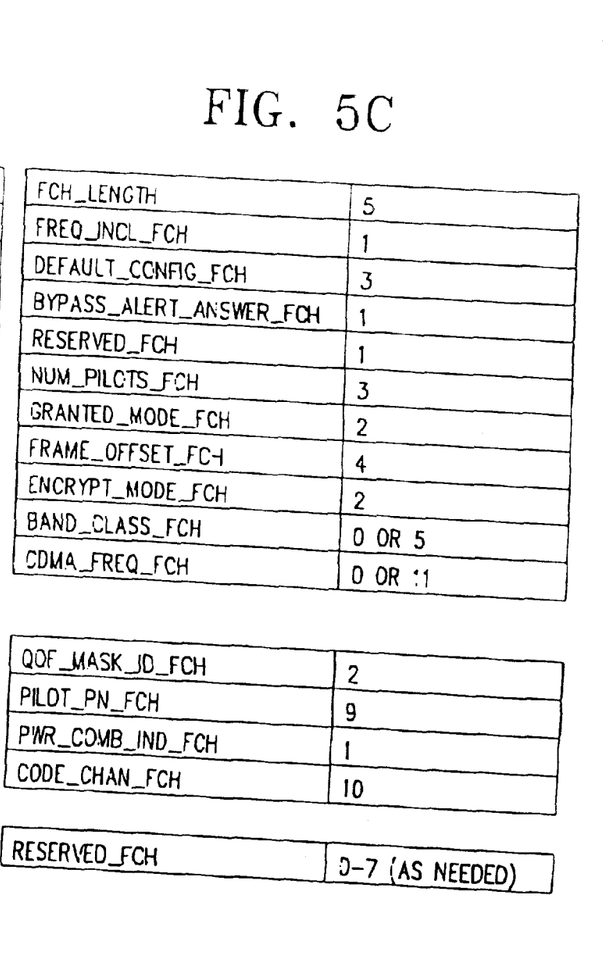

FIG. 5A illustrates an example of HDM fields commonly used to assign a dedicated control channel and a fundamental channel in a CDMA communication system using quasi-orthogonal codes, FIG. 5B illustrates message fields added to the message structure of FIG. 5A in the case of an HDM requesting an assignment of a dedicated control channel, and FIG. 5C illustrates message fields added to the message structure of FIG. 5A in the case of an HDM requesting an assignment of a fundamental channel. The messages as illustrated in FIGS. 5A, 5B, and 5C are used in step 200 of FIG. 1.

If FCH_INCLUDED and DCCH_INCLUDED in FIG. 5A are set to "1s", QOF_MASK_ID_DCCH of FIG. 5B and QOF_MASK_ID_FCH of FIG. 5C are activated when a quasi-orthogonal code is used and CODE_CHAN_DCCH of FIG. 5B and CODE_CHAN_FCH of FIG. 5C are activated.

When each BS in an active set assigns a channel using a quasi-orthogonal code, a quasi-orthogonal code mask to be used is written in a field QOF_MASK_ID OF FIG. 5A.

The fields described hereinbelow are needed to distinguish the elements of an active set of an MS. Referring to FIG. 5B, when each BS in the active set is to assign a dedicated control channel using a quasi-orthogonal code, a quasi-orthogonal code mask to be used is written in a field QOF_MASK_ID_DCCH. PILOT_PN_DCCH is the pilot PN offset index of a corresponding BS and set in units of 64PN chips. PWR_COMB_IND_DCCH is set to '1' to transmit a closed-loop power control subchannel which is the same as a pilot channel of the previously received message. CODE_CHAN_DCCH is a field indicating the index of a code to be used by a BS using the recorded pilot.

The message with the message format shown in FIGS. 5A and 5B is used to assign a dedicated control channel. The dedicated control channel is a new channel defined in the next-generation mobile communication system and has different physical characteristics than a fundamental channel defined in the IS-95 system. The dedicated control channel supports a discrete transmission mode in which data is transmitted only if the data to be transmitted is generated.

Figure 3:
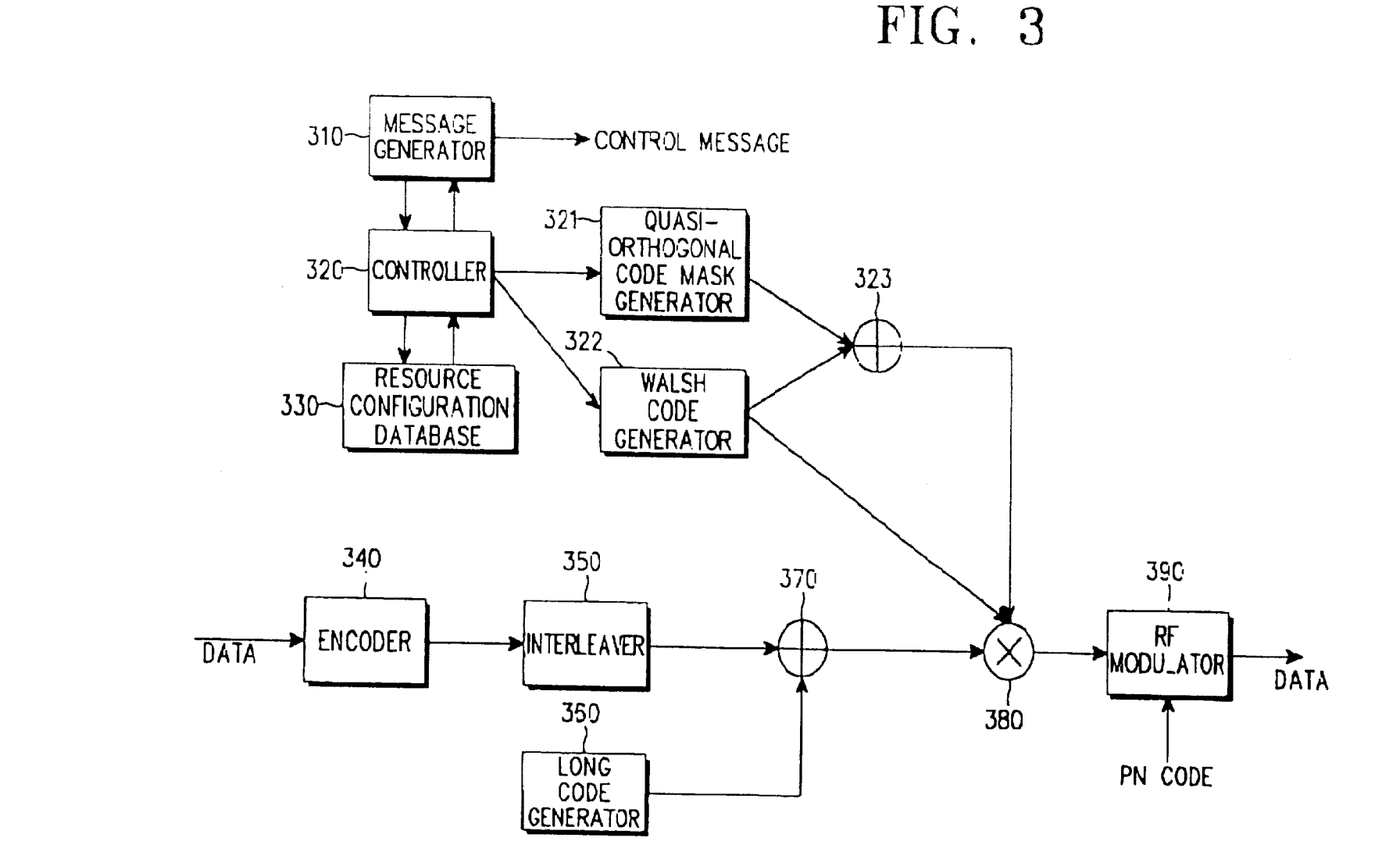
FIG. 3 is a block diagram of the BS transmitting device in the CDMA communication system in accordance with the present invention.
Figure 4:
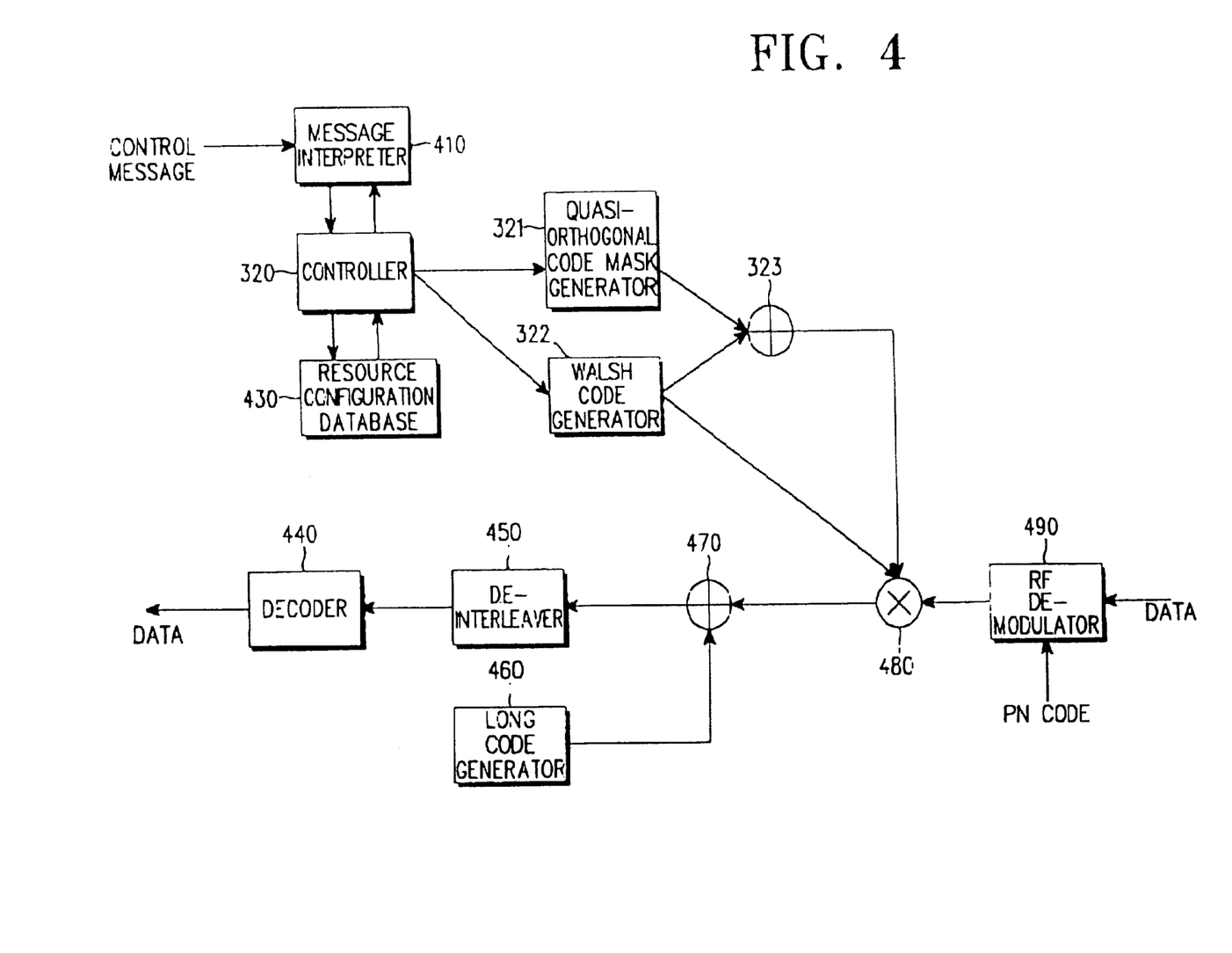
FIG. 4 is a block diagram of the MS receiving device in the CDMA communication system in accordance with the present invention.

FIG. 3 is a block diagram of a BS transmitting device which can generate a quasi-orthogonal code in a CDMA communication system where quasi-orthogonal codes provide channelization on a forward link, and FIG. 4 is a block diagram of an MS receiving device which can demodulate a channel signal spread by a quasi-orthogonal code in the CDMA communication system.

Step 190, in which fields of a control message are generated to assign a channel and step 210, in which a channel ID is interpreted and generated, in FIG. 1 are performed in connection with the components shown in FIGS. 3 and 4.

FIG. 3 is a block diagram of the BS transmitting device having a spectrum spreader using Walsh codes and quasi-orthogonal codes in the mobile communication system, to independently spread a channel signal.

A message generator 310 generates various messages under the control of a controller 320 during a call set-up. The messages are transmitted through a paging channel transmitter (not shown) or a dedicated control channel transmitter (not shown). Here, the paging channel transmitter transmits various messages and data, which are generated in the absence of a dedicated channel to an MS. The dedicated control channel transmitter transmits various messages and data for controlling a dedicated traffic channel to the MS.

The controller 320 provides overall control to the BS transmitting device. The controller 320 is a module which determines which code, between a Walsh code or a quasi-orthogonal code, is to be used for channelization during a call set-up in the embodiment of the present invention. If the quasi-orthogonal code is used, the controller 320 selects quasi-orthogonal code information, and controls channel assignment and generation of a control message. A resource configuration database 330 includes physical and logical resources necessary for communication with a current MS or an MS waiting for communication. The resource configuration database 330 has the mask numbers of quasi-orthogonal codes and the indexes of Walsh codes to assign the Walsh codes or the quasi-orthogonal codes according to the embodiment of the present invention. The resource configuration database 330 also stores information about whether quasi-orthogonal code masks and the Walsh code indexes are available or not. A quasi-orthogonal code mask generator 321 generates a quasi-orthogonal code mask corresponding to a quasi-orthogonal code mask number received from the controller 320. A Walsh code generator 322 generates a Walsh code corresponding to a Walsh code index. An adder 323 adds the quasi-orthogonal code mask received from the quasi-orthogonal code mask generator 321 to the Walsh code received from the Walsh code generator 322 to thereby produce a quasi-orthogonal code.

Meanwhile, a channel encoder 340 is a typical channel encoder for detecting errors from a communication channel and correcting the errors. An interleaver 350 randomizes burst errors. A long code generator 360 generates a long code using a long code mask. An adder 370 adds the outputs of the interleaver 350 and the long code generator 360, for scrambling. The scrambled information can be received only in a receiver using the same long code mask. A multiplier 380 multiplies the output of the adder 370 by the quasi-orthogonal code received from the adder 323 or the Walsh code received from the Walsh code generator 322 to provide channelization. An RF modulator 390 has a spectrum spreader for spreading the channel transmission signal received from the multiplier 380 with a PN sequence used to identify the BS through multiplication. The RF modulator 390 functions to generate an RF signal by spreading and modulating the channel transmission signal.

Referring to FIG. 3, upon generation of a message for channel assignment, the controller 320 receives information about the states of current stored resources from the resource configuration database 330, determines whether the number of available Walsh codes is greater than a threshold value, and controls generation of a Walsh code or a quasi-orthogonal code. If the number of available Walsh codes is greater than the threshold value, that is, available Walsh codes exist, the controller 320 selects one of available Walsh code indexes from the resource configuration database 330, notifies the Walsh code generator 322 of the selected Walsh code index, and updates information about the selected Walsh code index to indicate that it is in use. Then, the Walsh code generator 322 generates a Walsh code corresponding to the selected index and sends the Walsh code not to the adder 323 but to the multiplier 380 instead. The quasi-orthogonal code mask generator 321 generates no quasi-orthogonal code mask because it receives no information. Therefore, the adder 323 does not generate a quasi-orthogonal code.

On the other hand, if the number of the available Walsh codes is less than the threshold value, that is, no available Walsh codes exist, the controller 320 checks the states of quasi-orthogonal code mask numbers and corresponding Walsh code indexes in the resource configuration database 330, selects an available quasi-orthogonal code mask index and Walsh code index, notifies the quasi-orthogonal code mask generator 321 and the Walsh code generator 322 of the quasi-orthogonal code mask index and the Walsh code index, respectively, and updates information about the selected Walsh code index to indicate that it is in use. Then, the quasi-orthogonal code mask generator 321 generates a quasi-orthogonal code mask corresponding to the quasi-orthogonal code mask index. The Walsh code generator 322 generates a Walsh code corresponding to the Walsh code index and feeds the Walsh code not to the multiplier 380 but to the adder 323 instead. The adder 323 produces a quasi-orthogonal code by adding the quasi-orthogonal code mask received from the quasi-orthogonal code mask generator 321 to the Walsh code received from the Walsh code generator 322, and outputs the quasi-orthogonal code to the multiplier 380. The multiplier 380 distinguishes a channel using the quasi-orthogonal code.

To provide channelization using quasi-orthogonal codes, the controller 320 checks quasi-orthogonal code masks and Walsh codes remaining in the resource configuration database 330, selects an available quasi-orthogonal code mask number and Walsh code index, notifies the quasi-orthogonal code mask generator 321 and the Walsh code generator 322 of the selection, and controls the resource configuration database 330 to update information about the states of the selected quasi-orthogonal code mask number and Walsh code index. Then, the quasi-orthogonal code mask generator 321 and the Walsh code generator 322 generate corresponding quasi-orthogonal code mask and Walsh code and output them to the adder 323. In the case that a quasi-orthogonal code is not used, a channel ID is generated only using the Walsh code. That is, the controller 320 generates a Walsh code index without designating a quasi-orthogonal code mask number. Then, the quasi-orthogonal code mask generator 321 does not generate a quasi-orthogonal code mask and a Walsh code generated in the Walsh code generator 322 is applied to the multiplier 380 through the adder 323.

If a quasi-orthogonal code is to be used, the adder 323 generates the quasi-orthogonal code with the outputs of the quasi-orthogonal code mask generator 321 and the Walsh code generator 322. If no quasi-orthogonal code is to be used, the adder 323 generates an orthogonal code for channel spreading, using only the output of the Walsh code generator 322. The controller 320 notifies a message generator 310 of the quasi-orthogonal code mask or the Walsh code index in use and sets the field QOF_MASK_ID_DCCH or CODE_CHAN_DCCH, respectively, in a channel assignment message to a corresponding value, and sends the channel assignment message to an MS.

FIG. 4 is a block diagram of an MS receiving device according to the embodiment of the present invention.

In FIG. 4, a control message received in an MS through a reception antenna is applied to a message interpreter 410 through a paging channel receiver or a dedicated control channel receiver. The message interpreter 410 interprets channel ID information from the fields QOF_MASK_ID_DCCH and CODE_CHAN_DCCH, in FIG. 5B, of the channel assignment message, and sends the channel ID information to the controller 320. The controller 320 sends the channel ID information to the quasi-orthogonal code mask generator 321 and the Walsh code generator 322 and updates the data of a resource configuration database 430. If a quasi-orthogonal code is used, the quasi-orthogonal code mask generator 321 and the Walsh code generator 322 generate a quasi-orthogonal code mask and a Walsh code, respectively. The adder 323 generates a quasi-orthogonal code by adding the quasi-orthogonal code mask to the Walsh code. In this case, the Walsh code is not applied to a multiplier 480. If the field QOF_MASK_ID_DCCH is NONE ("00") shown in (table 1) from the analysis of the channel assignment message in the message interpreter 410, it implies that only a Walsh code has been used in a BS. Therefore, a Walsh code index written in the field CODE_CHAN_DCCH is sent to the Walsh code generator 322. Then, the output of the Walsh code generator 322 is applied to the input of the multiplier 480 and no quasi-orthogonal code is generated by the adder 323. The resource configuration database 430 is used mainly to store information about resources assigned by the BS. If it turns out in a message interpretation that a quasi-orthogonal code is not used, the channel ID is generated using the Walsh code only.

Upon receipt of data or a message on a channel assigned by the BS, the received signal is applied to the multiplier 480 through an RF demodulator 490. The RF demodulator 490 is provided with a PN sequence generator to despread the received signal with a PN sequence through multiplication and detects a signal of the corresponding BS. The multiplier 480 detects a signal of a corresponding channel by multiplying the output of the RF demodulator 490 by the quasi-orthogonal code or the Walsh code. An adder 470 adds the output of the multiplier 480 to a long code, for descrambling. Here, a long code generator 460 generates the long code using a selected long code mask. A deinterleaver 450 deinterleaves the output of the adder 470 and a channel decoder 440 channel-decodes the deinterleaved signal.

FIGS. 2A and 2B are flowcharts depicting a handoff procedure respectively in the BS transmitting device and the MS receiving device of a CDMA communication system where orthogonal channelization is provided to a forward link according to an embodiment of the present invention.

Referring to FIG. 2A, upon receipt of a PSMM, the controller 320 of the serving BS currently connected to the MS determines whether a new pilot is listed in the PSMM and controls all channels occupied by the MS, including a dedicated control channel, for handoff, in step 210. If a new pilot exists in the PSMM, the controller 320 of the serving BS transmits a resource allocation order to a new BS to which a call is to be switched in step 190 of FIG. 1. The resource allocation order includes information about the channels used by the MS.

In step 220, the controller 320 of the new BS determines whether available physical resources exist in the resource configuration database 330. To do so, it is determined whether available Walsh codes exist by comparing the number of remaining Walsh codes with a threshold value. If no available physical resources exist in step 220, the controller 320 of the new BS determines whether a quasi-orthogonal code can be used by referring to a database stored in the resource configuration database 330 in step 241. If a quasi-orthogonal code can be used, the controller 320 of the new BS goes to step 251, and otherwise, it declares that a handoff cannot be implemented and notifies the serving BS of the absence of available physical channels. In step 251, the controller 320 of the new BS applies a quasi-orthogonal code mask index and a Walsh code index used to generate a quasi-orthogonal code to the quasi-orthogonal code mask generator 321 and the Walsh code generator 322, respectively. The quasi-orthogonal code mask generator 321 generates a corresponding quasi-orthogonal code mask and the Walsh code generator 322 generates a Walsh code corresponding to the Walsh code index. The adder 323 adds the Walsh code and the quasi-orthogonal code mask, thereby generating the quasi-orthogonal code in step 261.

The controller 320 of the new BS transmits a resource allocation response message including the designated quasi-orthogonal code mask index and Walsh code index to the serving BS. The controller 320 of the serving BS controls the message generator 310 to generate CODE_CHAN_FCH of FIG. 5B or CODE_CHAN_DCCH of FIG. 5C, in step 270. Activation of the field CODE_CHAN_FCH or CODE_CHAN_DCCH depends on a channel used by the MS. The channel used can be detected by analyzing the PSMM. If CHAN_FIELD is generated according to the channel used, the controller 320 of the serving BS designates a quasi-orthogonal mask field, generates an HDM, and transmits the HDM to the MS, in step 280. The quasi-orthogonal mask field can be QOF_MASK_ID_DCCH of FIG. 5B or QOF_MASK_ID_FCH of FIG. 5C according to the activated field CODE_CHAN.

If available Walsh codes remain in step 220, the controller 320 of the new BS designates an available Walsh code in step 250 and controls the Walsh code generator 322 to generate the corresponding Walsh code in step 260. The Walsh code is applied to the multiplier 380 and the multiplier 380 spreads a transmission signal with the Walsh code. The controller 320 of the new BS transmits a resource allocation response message including the Walsh code index simultaneously with generation of the Walsh code.

Upon receipt of the resource allocation response message, the controller 320 of the serving BS sets the channel field CODE_CHAN_FCH or CODE_CHAN_DCCH to the designated Walsh code index in step 270, and transmits a HDM with the activated field CODE_CHAN_FCH or CODE_CHAN_DCCH to the MS.

If a quasi-orthogonal code is assigned, CODE_CHAN and QOF_MASK_ID are activated. If a Walsh code is assigned, only CODE_CHAN is activated.

FIG. 2B is a flowchart depicting a handoff procedure in the MS which receives the HDM from the BS, as described in FIG. 2A.

Referring to FIG. 2B, the controller 320 of the MS determines whether the HDM, including a channel ID, has been received from the BS through the message interpreter 410, in step 212. Upon receipt of the HDM, the controller 320 goes to step 222, and otherwise, it goes to step 292 to await the receipt of the HDM.

In step 222, the controller 320 determines whether a quasi-orthogonal code mask has been used or not by analyzing QOF_MASK_ID_FCH or QOF_MASK_ID_DCCH specified in the HDM through the message interpreter 410. If the quasi-orthogonal code has been used, the controller 320 reads a quasi-orthogonal code mask index and a Walsh code index set in the HDM in step 232. Then, the controller 320 generates a quasi-orthogonal code mask corresponding to the quasi-orthogonal code mask index and a Walsh code corresponding to the Walsh code index in step 242 and generates the quasi-orthogonal code by mixing the quasi-orthogonal code mask with the Walsh code in step 252.

If it is determined that only CODE_CHAN_FCH or CODE_CHAN_DCCH is activated in the HDM in step 222, the controller 320 interprets only a Walsh code index set in CODE_CHAN_FCH or CODE_CHAN_DCCH through the message interpreter 410 in step 233 and generates the Walsh code corresponding to the Walsh code index in step 243.

After the quasi-orthogonal code or the Walsh code is generated in step 252 or 243, the controller 320 assigns a demodulator for an assigned forward link channel in step 262, and sends the BS a HCM, notifying that it is ready for receiving the forward link channel in step 272. The HCM can be transmitted on an access channel or a reverse dedicated control channel. Then, the MS releases a link from the serving BS and establishes a link to the new BS whose pilot is added in a PSMM on the established channel.

During the procedures illustrated in FIGS. 2A and 2B, the BS can use a Walsh code in assigning a high priority channel, even in the situation where a quasi-orthogonal code is normally used.

Code assignment is based on a channel priority determined in the following ways: (1) Use of quasi-orthogonal codes can be limited if data requiring high QoS (Quality of Service) is to be transmitted; (2) Users are classified and a Walsh code is assigned to a user in a high class; and (3) a higher priority is given to a fundamental channel or a control channel on which important control information should be transmitted with less errors. The channel priority can be adjusted as needed.

While assignment of quasi-orthogonal codes for a fundamental channel and a dedicated control channel during handoff has been described according to the preferred embodiment of the present invention, the description also applies to a supplemental channel. In the case of the supplemental channel, fields CODE_CHAN_SCH and QOF_MASK_ID_SCH are just added to the handoff direction message.

As described above, the present invention can assign an orthogonal code even to a fundamental channel or a dedicated control channel in the next-generation CDMA communication system because quasi-orthogonal codes can be used in assigning channels, as well as the limited number of Walsh codes. Another advantage is that an orthogonal code can be assigned to a new added dedicated control channel as well as a fundamental channel, thereby allowing a handoff on the dedicated control channel.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A handoff method between a serving base station and a new base station during a call between the serving base station and a mobile station using a given orthogonal code in a CDMA communication system, comprising the steps of:
   notifying the serving base station of an available quasi-orthogonal code, said serving base station notification done by the new base station;
   notifying the mobile station of the available quasi-orthogonal code, said mobile station notification done by the serving base station; and
   communicating with the new base station using the available quasi-orthogonal code by the mobile station when a handoff occurs.

2. The handoff method of claim 1, wherein if the new base station has no available Walsh codes, the new base station transmits the quasi-orthogonal code to the serving base station.

3. The handoff method of claim 1, wherein if the serving base station communicates with the mobile station on a fundamental channel, the serving base station activates fields CODE_CHAN_FCH and QOF_MASK_ID_FCH in the handoff direction message prior to transmission of the handoff direction message.

4. The handoff method of claim 1, wherein if the serving base station communicates with the mobile station on a dedicated control channel, the serving base station activates fields CODE_CHAN_DCCH and QOF_MASK_ID_DCCH in the handoff direction message prior to transmission of the handoff direction message.

5. The handoff method of claim 1, wherein if the serving base station communicates with the mobile station on a fundamental channel and a dedicated control channel, the serving base station activates fields CODE_CHAN_FCH, CODE_CHAN_DCCH, QOF_MASK_ID_FCH, and QOF_MASK_ID_DCCH in the handoff direction message prior to transmission of the handoff direction message.

6. The handoff method of claim 1, wherein if the serving base station communicates with the mobile station on a dedicated control channel and a supplemental channel, the serving base station activates fields CODE_CHAN_SCH and QF_MASK_ID_SCH in the handoff direction message prior to transmission of the handoff direction message.

7. A handoff method for a mobile station in a CDMA communication system, which generates a Walsh code and a quasi-orthogonal code and receives a handoff direction message from a serving base station, comprising the steps of:

determining whether a quasi-orthogonal code is set in an orthogonal code assignment field of the handoff direction message; and communicating with a new base station to which a call is switched using the quasi-orthogonal code during handoff, if the quasi-orthogonal code is set in the orthogonal code assignment field in the handoff direction message.

8. The handoff method of claim 7, wherein if the serving base station communicates with the mobile station on a fundamental channel, the serving base station activates fields CODE_CHAN_FCH and QOF_MASK_ID_FCH in the handoff direction message prior to transmission of the handoff direction message.

9. The handoff method of claim 7, wherein if the serving base station communicates with the mobile station on a dedicated control channel, the serving base station activates fields CODE_CHAN_DCCH and QOF_MASK_ID_DCCH in the handoff direction message prior to transmission of the handoff direction message.

10. The handoff method of claim 7, wherein if the serving base station communicates with the mobile station on a fundamental channel and a dedicated control channel, the serving base station activates fields CODE_CHAN_FCH CODE_CHAN_DCCH, QOF_MASK_ID_FCH, and QOF_MASK_ID_DCCH in the handoff direction message prior to transmission of the handoff direction message.

11. The handoff method of claim 7, wherein if the serving base station communicates with the mobile station on a supplemental channel, the serving base station activates fields CODE_CHAN_SCH and QOF_MASK_ID_SCH in the handoff direction message prior to transmission of the handoff direction message.

12. A handoff method for a mobile station which receives a handoff direction message from a serving base station, comprising the steps of:

determining whether a quasi-orthogonal code mask ID is set in the handoff direction message; and communicating with a new base station to which a call is handed off using the quasi-orthogonal code mask ID, if the quasi-orthogonal code mask ID is set in the handoff direction message.

* * * * *

UNITED STATES PATENT AND TRADEMARK OFFICE
CERTIFICATE OF CORRECTION

PATENT NO.    : 6,477,157 B1
DATED         : November 5, 2002
INVENTOR(S)   : Dae-Gyun Kim and Chang-Hoi Koo It is certified that error appears in the above-identified patent and that said Letters Patent is hereby corrected as shown below:

<u>Title page,</u>
Item [30], Foreign Application Priority Data should read as follows:

"Nov. 17, 1998         (KR)………………......1998-19862"

should be

-- Nov. 17, 1998         (KR)…………………..1998-49862 --.

Signed and Sealed this

Eighteenth Day of February, 2003

JAMES E. ROGAN
*Director of the United States Patent and Trademark Office*